United States Patent [19]

DiDomenico, Jr.

[11] Patent Number: 4,656,061

[45] Date of Patent: Apr. 7, 1987

[54] HIGH SOLIDS COATING COMPOSITIONS BASED ON FATTY POLYOLS

[75] Inventor: Edward D. DiDomenico, Jr., Anoka, Minn.

[73] Assignee: Henkel Corporation, Minneapolis, Minn.

[21] Appl. No.: 716,276

[22] Filed: Mar. 26, 1985

Related U.S. Application Data

[63] Continuation-in-part of Ser. No. 620,641, Jun. 14, 1984, abandoned.

[51] Int. Cl.$^4$ .................... B05D 3/02; C08G 12/12
[52] U.S. Cl. ...................... 427/385.5; 427/388.2; 528/230; 528/245.3; 528/245.5; 528/256; 528/260; 528/261; 528/262
[58] Field of Search ............... 528/245.5, 245.3, 256, 528/259, 260, 261, 262, 230; 427/385.5, 388.2

[56] References Cited

U.S. PATENT DOCUMENTS

| | | | |
|---|---|---|---|
| 2,491,533 | 12/1949 | Swern | 260/615 |
| 3,234,249 | 2/1966 | Brack | 260/407 |
| 3,475,359 | 10/1969 | Cummings | 528/245.5 |
| 3,481,892 | 12/1969 | Huang et al. | 528/245.5 |
| 4,107,113 | 8/1978 | Gibson et al. | 528/245.5 |
| 4,246,376 | 1/1981 | DiDomenico, Jr. | 528/230 X |
| 4,299,737 | 11/1981 | Meffert et al. | 252/522 R |
| 4,351,935 | 9/1982 | Reesink et al. | 528/242 |
| 4,456,747 | 6/1984 | DiDomenico, Jr. | 528/254 |

FOREIGN PATENT DOCUMENTS

| | | | |
|---|---|---|---|
| 57-074356 | 5/1982 | Japan | 528/245.5 |
| 1027749 | 4/1966 | United Kingdom | |

*Primary Examiner*—Thurman K. Page
*Attorney, Agent, or Firm*—Ernest G. Szoke; John Daniel Wood; Patrick J. Span

[57] ABSTRACT

A composition of matter useful as a high solids coating is disclosed. The composition contains at least one fatty polyol derived by ring-opening an epoxidized fatty alcohol or ester, and at least one methylolamino curing agent. The coatings from these compositions have increased flexibility as compared to coatings prepared from comparable polyols.

10 Claims, No Drawings

HIGH SOLIDS COATING COMPOSITIONS BASED ON FATTY POLYOLS

This application is a continuation-in-part of U.S. application Ser. No. 620,641 filed 06/14/84 and now abandoned.

BACKGROUND OF THE INVENTION

1. Technical Field of the Invention

The present invention is directed to compositions of matter which contain certain fatty polyols and methylolamino curing agents and which are useful in preparing cured coatings.

2. Description of the Prior Art

High molecular weight acrylic and polyester resins have dominated the coating industry, primarily as a result of the combination of properties, i.e., film hardness, flexibility, chemical resistance, water resistance, and gloss retention, required by the industry. However, with the advent of solvent emission regulations, the industry has turned to high solids coatings. Initial work on high solids coatings was directed to lowering the molecular weight of the acrylic and polyester resins. Because polyester resins could be made at much lower molecular weights than acrylic resins, most of the interest centered on making very low molecular weight polyester polyols which could be cured with melamines and other methylolamino curing agents.

Conventional high solids polyesters are made from short chained aliphatic diol and triols such as 1,4-butanediol, 1,6-hexanediol, trimethylolpropane, or glycol ether polyols. These are reacted with difunctional acids or esters such as adipic acid, maleic anhydride, and phthalic anhydride. In order to get the proper combination of hardness and flexibility in low molecular weight polyesters it is important that a combination of hard and soft polyalcohols and polyacids be used. The hard components are usually the poly-functional acids or esters such as phthalic anhydride. These are usually aromatic or unsaturated aliphatic acids which impart rigidity to the polyester resin, which translates into film hardness. The soft component is usually the polyol, e.g., 1,4-butanediol, 1,9-nonanediol, or glycol ether polyols. One exception is trimethylolpropane which promotes film hardness by increasing crosslink density. If diols such as 1,6-hexanediol or 1,4-butanediol are used, then esterified or partially esterified very low molecular weight products in the polyester resin are volatized when the polyester resin is cured with melamines. If glycol ether polyols are used such as ethylene or propylene glycol, then the ether functionality causes water sensitivity and poor gloss and color retention. Thus, while high solids polyesters have achieved some success in reducing solvent emissions in coatings, their performance properties are generally inferior to high molecular weight acrylic and polyester resins.

U.S. Pat. No. 3,234,249 to Brack, discloses that epoxy fatty alcohols can be reacted with polycarboxylic acids to form polyhydroxy polyesters that are useful in the preparation of a variety of products, e.g. films, by reaction with a variety of materials, e.g. melamine-formaldehyde resins. The patentee states that the primary hydroxyl group of the epoxy fatty polyol may also be esterified such that the resulting polyol will have large numbers of hydrolyzable ester linkages, i.e. two or more per polyol molecule.

As used herein, the term methylolamino denotes a compound which is the product of a polyfunctional amino compound and an aldehyde (usually formaldehyde, giving rise to the methyl term) and the etherified and partially etherified derivatives thereof. The term polyfunctional amino encompasses compounds of the formula:

$$(R'HN)_n-R-NHR''$$

where n is 1 or greater, R' and R'' are hydrogen or other groups including cycle forming carbons and R is a carbon containing backbone.

Methylolamino curing agents including those derived from melamines, guanamines, urea formaldehydes and glycoluril, are well known in the art. See, e.g. U.S. Pat. No. 4,246,376 to DiDomenico and the references cited therein, the disclosures of which are hereby incorporated by reference.

SUMMARY OF THE INVENTION

The present invention is directed to a composition of matter which is a mixture of at least one methylolamino compound and at least one fatty polyol of the formula:

$$R^1-((R^2-O)-CH-CH-(O-R^3))-R^4-O-R^5$$

wherein:
  $R^1$ is a monovalent hydrocarbon radical having from 2 to 14 carbon atoms;
  $R^2$ and $R^3$ are individually selected from the group of hydrogen, hydroxyl-substituted alkyl radicals, hydroxyl-substituted alkoxyalkyl radicals and hydroxyl-substituted poly(oxyakylene) radicals, provided that each radical contains from 2 to 32 carbon atoms and from 1 to 9 hydroxyl substitutents and, provided further, that at least one of $R^2$ and $R^3$ is other than hydrogen;
  $R^4$ is a divalent hydrocarbon radical having from 4 to 14 carbon atoms provided that the sum of the carbon atoms in $R^1$ and $R^4$ must be from 10 to 24; and
  $R^5$ is selected from the group of hydrogen, hydroxyl-substituted alkyl radicals, hydroxyl-substituted alkoxyalkyl radicals, hydroxyl-substituted poly(oxyalkylene) radicals, provided that each hydroxyl-substituted radical contains from 2 to 32 carbon atoms and from 1 to 9 hydroxyl substituents, and acyl radicals having the structural formula $$OC-R^6-(R^7-O)-CH-CH-))-R^9$$

wherein:
  $R^6$ is a divalent hydrocarbon radical having from 3 to 13 carbon atoms;
  $R^7$ and $R^8$ are individually selected from the group of hydrogen, hydroxyl-substituted alkyl radicals, hydroxyl-substituted alkoxyalkyl radicals and hydroxyl-substituted poly(oxyalkylene) radicals, provided that each radical contains from 2 to 32 carbon atoms and from 1 to 9 hydroxyl substituents and, provided further, that at least one of $R^7$ and $R^8$ is other than hydrogen; and
  $R^9$ is a monovalent hydrocarbon radical having from 2 to 14 carbon atoms provided that the sum of the carbon atoms in $R^6$ and $R^9$ must be from 9 to 23.

It has been found that these fatty polyols yield coatings which have greater flexibility than similar coatings made from comparable triols such as 9,9(10,10)-bis(hydroxymethyl)octadecanol and few, if any, hydrolyzable ester linkages.

DETAILED DESCRIPTION OF THE PREFERRED EMBODIMENTS

The above structural formula of the fatty polyols useful in this invention encompasses a wide variety of fatty polyols. The preferred polyols are derived from fatty alcohols having a high proportion of oleyl alcohol, which have been epoxidized and subsequently ring-opened with a diol or a triol such as ethylene glycol or trimethylolpropane, i.e. a fatty polyol wherein $R^1$ is a straight-chain alkyl group having 8 carbon atoms, one of $R^2$ and $R^3$ is hydrogen and one is the residue of ethylene glycol (-CH2CH20H) or tri-methylolpropane (—CH$_2$C(CH$_2$OH)$_2$CH$_2$CH$_3$), $R^4$ is a straight-chain alkylene radical having 8 carbon atoms, and $R^5$ is hydrogen. The preferred monovalent hydrocarbon radicals for $R^1$ and $R^9$ are straight chain alkyl and alkenyl radicals. The preferred divalent hydrocarbon radicals for $R^4$ and $R^6$ are straight chain alkylene and alkenylene radicals. By selecting among the various available naturally occurring and synthetic fatty alcohols, it is possible to obtain, by the processes described hereinafter, fatty polyols having the above structure which are useful in the present invention.

The fatty polyols useful in this invention can be obtained by epoxidizing unsaturated $C_{12}$–$C_{26}$ fatty alcohols or fatty esters which are then reacted with polyfunctionalhydroxy compounds containing from 2 to 10 —OH groups, with opening of the epoxide rings. If desired, this reaction product is subsequently reacted with an alkylene oxide.

The fatty polyols useful in this invention are chemical compounds derived predominantly from renewable raw materials. They are derived from triglycerides, i.e. fatty oils, of vegetable, animal or marine animal origin.

It is known that triglycerides can be reacted, for example, to form methyl esters which can be catalytically reduced to alcohols of the type known as fatty alcohols. Fatty alcohols are understood to be primary monofunctional alcohols which are derived from fatty acid derivatives. Fatty alcohols obtainable on an industrial scale are not pure chemical substances, but are mixtures of alcohols of different chain lengths which contain between 0 and 3 double bonds. The composition of the fatty alcohol mixtures depends upon the nature of the triglyceride from which they have been obtained. However, it is possible to enrich individual fatty alcohols in the mixtures by extraction, fractional crystallization, or distillation, or to produce fatty alcohols from fatty acid fractions which have already been pretreated in this way.

When used herein, the term "fatty alcohol" means one or a mixture of two or more unsaturated alcohols having the structural formula:

$$R^1-HC=CH-R^4-O-H$$

wherein, $R^1$ and $R^4$ are as previously defined, often in admixture with at least one saturated alcohol. The most common unsaturated constituents of fatty alcohols are:

$C_{16}$: palmitoleyl alcohol
$C_{18}$: oleyl alcohol, elaidyl alcohol, linoleyl alcohol, linolenyl alcohol
$C_{20}$: gadoleyl alcohol, arachidonic alcohol
$C_{22}$: erucic alcohol, brassidyl alcohol Fatty alcohols containing one or more of these constituents in large or predominant quantities can be epoxidized by known methods, for example, using peracids, such as peracetic acid. The epoxidation of monounsaturated fatty alcohols may be carried out with high conversions, for example of from 80 to 100 mole percent. In the case of polyunsaturated alcohols, it is only the first double bond which is quantitatively epoxidized. The epoxidation of other double bonds requires severe reaction conditions.

Epoxidized fatty alcohols containing from 30 to 100 mole percent of epoxide groups and preferably from 70 to 95 mole percent of epoxide groups, based on the double bonds originally present, are used for the production of the fatty polyols useful in this invention. Epoxidized fatty alcohols based on fatty alcohols having iodine numbers of from 20 to 170 can be used herein. Suitable epoxidized fatty alcohols are derived, for example, from the following fatty alcohols:

(1) tallow alcohol having an iodine number of from 50 to 55 and containing saturated $C_{12}$-$C_{20}$ alcohols, produced from tallow fatty acid esters;

(2) tallow alcohol having an iodine number of from 80 to 85 produced from tallow fatty acid esters in which the unsaturated fractions have been enriched by preferential wetting;

(3) tallow alcohol having an iodine number of from 92 to 96 produced from tallow alcohol having an iodine number of from 80 to 85 by crystallizing out and separating off saturated fractions (approximately 90% of the resulting product consists of oleyl alcohol);

(4) soy alcohol having an iodine number of from 110 to 130 produced from soy fatty acid and containing approximately 30% oleyl alcohol, approximately 40% linoleyl alcohol and approximately 7% linolenyl alcohol;

(5) rape oil alcohol having an iodine number of from 90 to 100 and containing approximately 50% by weight of erucic alcohol;

(6) and also from fatty alcohols based on train oil fatty acid, palm oil fatty acid, linseed oil fatty acid, peanut oil fatty acid, and cottonseed oil fatty acid.

Where the starting material used is a fatty alcohol having an iodine number of from 50 to 55, an epoxide number of from 2.5 to 2.7% by weight of epoxide oxygen is attained after epoxidation.

Fatty alcohols having iodine numbers of from 110 to 130 can be epoxidized up to an epoxide number of approximately 5% by weight of epoxide oxygen, leaving a residual iodine number of from 2 to 30.

The epoxidized fatty alcohols or fatty esters are subjected to a catalytic ring-opening reaction with at least one polyfunctional-hydroxy compound having the structural formula $R^2$—OH or $R^3$—OH, wherein $R^2$ and $R^3$ are as defined previously, with the exception that they may not be hydrogen. Suitable polyfunctional-hydroxy compounds include ethylene glycol and trimethylolpropane.

Because a "fatty polyol" as defined above, is also a "polyfunctional-hydroxy compound", either of $R^2$ and $R^3$ and either of $R^7$ and $R^8$ may be a hydroxyl-substituted alkoxyalkyl radical which is also the residue of a fatty polyol as defined above. For example, any of the hydroxyl groups of 9(10)-(2-hydroxyethyl)-10(9)-hydroxyoctadecanol, a fatty polyol as defined above, can ring open the epoxide group of epoxidized oleyl alcohol to prepare a fatty polyol wherein $R^2$ or $R^3$ is the residue of 9(10)-(2-hydroxyethyl)-10(9)-hydroxyoctadecanol.

For acid-catalyzed ring-opening, it is preferred initially to introduce the polyfunctional-hydroxy component and catalytic quantities of an acid, for example sulfuric acid, phosphoric acid, p-toluenesulfonic acid or acid ion exchangers, into the reaction vessel and then to add the epoxidized fatty alcohol in portions at temperatures in the range of from about 50° to about 130° C. and preferably at temperatures in the range of from about 70° to about 100° C.

The course of the reaction may be followed by gas chromatography or even by titration of the residual epoxide oxygen. The epoxidized fatty alcohol is quantitatively reacted after reaction times of from about 2 to about 6 hours and preferably of from about 3 to about 5 hours, depending on the size of the batch and the addition rate. At the end of the reaction, the acid catalyst can be neutralized by suitable bases. Readily volatile constitutents, such as for example, unreacted polyfunctional-hydroxy compounds or even saturated or unsaturated non-epoxidized fatty alcohols, can be distilled off in vacuo.

Acid catalysis is preferred for use in the above process wherein epoxidized fatty alcohols are reacted with polyfunctional aliphatic alcohols. Other variants of the process can also be used for carrying out the acid-catalyzed ring-opening reaction. Thus, all the starting materials can be simultaneously introduced into the reaction vessel or, alternatively, either the polyfunctional hydroxy component or the epoxidized fatty alcohol can be added incrementally.

The preferred method of obtaining the fatty polyols of this invention wherein $R^5$ is an acyl group, as defined above, is to esterify an unsaturated fatty alcohol with an unsaturated fatty acid, then epoxidize the resulting ester and ring-open with the desired polyfunctional hydroxy compound selected from the group of $R^2$, $R^3$, $R^7$ and $R^8$. The product of this procedure will produce a fatty polyol wherein $R^2$ and $R^3$ will be the same as $R^7$ and $R^8$, but not necessarily respectively.

The fatty polyols useful in this invention wherein $R^2$, $R^3$, $R^7$ or $R^8$ is an hydroxyl-substituted alkoxylalkyl radical or an hydroxyl-substituted poly(oxyalkylene) radical are obtained by reacting the ring-opened fatty polyols with alkylene oxides. It is possible to react the fatty polyols useful in this invention with alkylene oxides such as ethylene oxide, propylene oxide, glycidyl ethers and the like to modify water solubility and viscosity and to provide greater flexibility in the coating.

The other component utilized in forming the compositions of the present invention is the methylolamino compound. These materials are generally sold as ethers of the reaction product of formaldehyde and an amino material such as melamine, urea, thiourea, guanamines, substituted thioameline, triaminopyrimidine, 2-mercapto-4,6-diaminopyrimidine, 3,5-diaminotriazole, carbamylguanazole, 2,4-diaminothiodiazole, glycoluril, and 2-oxo-4,5-diaminoparabanic acid.

Basically, the most practical components for use herein are the melamine, urea, glycoluril and guanamine materials. Stated simply, the preparation of such material is old in the art and it is sufficient to say that formaldehyde is reacted with the amino hydrogens in varying amounts depending upon the type of resin which is desired. Thus, with melamine which contains three primary amine groups, it is necessary to react at least two of the amino hydrogens in order to form a product which will crosslink with a trifunctional alcohol. The adduct of the amino compound and the formaldehyde is ordinarily sold as an ether, in most cases that of butanol. Etherification prevents the reaction product of the amino compound and formaldehyde from crosslinking and solidifying through continued reaction of the hydroxyl group on one of the reaction products with an unreacted amine hydrogen on another molecule of the amine compound. The etherification also modifies water and organic phase solubility, lessens self-condensation during cure, and gives a product which is less hydroscopic.

The particular advantage to using melamine based materials as the amino component is that both of the hydrogens on any amino group are available for reaction with formaldehyde, whereas when using urea it is difficult to react the second hydrogen following addition of the first mole of formaldehyde to the amino group.

Set out below are various tradenames of methylolamino compounds used in the present invention. These alcohols have been conveniently etherified with a material such as butanol or methanol or other monohydric alcohol to provide storage stability. A particularly useful material in the present invention is Cymel 303 a fully methylated melamine formaldehyde resin obtained from the American Cyanamid Company. Other useful resins also available from American Cyanamid include the melamine formaldehydes sold as Cymel 300, 301, 350, 370, 373, 380, 1116, 1156 and 1130. The benzoguamines are sold as Cymel 1123, 1125 and 1134.

The urea-formaldehyde resins included herein are available from American Cyanamid and include Beetle 60, 65, 80 and XB-1050. Partially alkylated melamine resins include Cymel 325, 370, 380, 243, 245, 248 and 255. The foregoing resins are described in a publication of American Cyanamid entitled Amino Cross-Linking Agents.

Additional methylolamino compounds include the guanamines and benzoguanamines; substituted thioameline; triaminopyrimidine; 2-mercapto-4,6-diaminopyrimidine; 3,5-di-aminotriazole; carbamylguanazole; 2,4-diaminothiodiazole; 2-oxo-4,5-diaminoparabanic acid, and mixtures thereof.

The methylolamino component of the composition is generally present in amounts, by weight, up to about 90%. The diol component may be present in amounts, by weight, up to 80%. Various modifiers may be included in the composition such as pigments, flow control agents, dispersants, etc., in minor amounts.

Coatings are prepared conveniently by using the methanol or butanol adduct of the methylolamino compound which is mixed with the fatty polyol. The coating is applied by brushing, knife edge, spray or other conventional means followed by baking. Acid catalysts are added at low levels to the coating compositions of this invention to effect the cure thereof. Particularly suitable are blocked acid catalysts which can be mixed with the coating compositions of this invention but do not catalyze the curing reaction until subjected to heat to generate an acid free of the blocking agent.

The composition of the present invention as previously noted is highly useful in forming coatings, particularly coatings for laundry appliances, refrigerators, and generally for any metal requiring a protective coating. In particular, the composition of the present invention is highly useful in the area of high solids coatings requiring little or no volatile solvent in the product. For instance, it has been extremely difficult to formulate coatings such as are described herein wherein high molecular weight alcohols are employed. That is, high molecular weight alcohols are ordinarily solid materials. However, using the components described herein, liquid coating compositions which exceed 70% solids and in some cases up to 100% solids can be obtained using conventional coating equipment such as high speed electrostatic disk applicators, conventional spray equipment, and hand application such as brushing.

The composition of the invention exhibits additional advantages over other high solids by virtue of the properties of the fatty polyol component. More specifically, the fatty polyol component has few ether linkages which might detract from chemical resistance or color and gloss retention, few, if any, ester linkages which might detract from chemical resistance, no aromatic groups to detract from gloss and color retention on weathering. Conversely, the fatty polyols of the invention have high molecular weight and a low vapor pressure which combines to give a highly crosslinkable film, and they have primary hydroxyls which are separated by a long hydrocarbon chain which promotes film flexibility. Finally, because the fatty polyols are water insoluble, they introduce no water sensitivity into the cured film. However, they can be easily emulsified or modified with propylene or ethylene oxide to render them water soluble, for use in water based coatings.

To further illustrate various aspects of the invention, the following Examples are provided, it being understood that its purpose is entirely illustrative and in no way intended to limit the scope of the invention.

EXAMPLES

1. Epoxidized Fatty Alcohols

The properties of the epoxidized fatty alcohols used in the following examples are shown in Table 1. These epoxidized fatty alcohols are prepared by a known method, i.e., by the method described by D. Swern et al., in J. Am. Chem. Soc. 66, 1925 (1944). Other known methods can also be employed for their preparation.

2. Production of Fatty Polyols

Initially, the hydroxyl group-containing compound is introduced, followed by the addition of 0.1 to 0.5 g of sulfuric acid per mole of epoxidized fatty alcohol to be reacted. After heating to 70°–100° C., the epoxidized fatty alcohol is added in molten form. The end of the reaction (in the case of 1 kg laboratory batches, after 3 hours) is determined by gas chromatography. The sulfuric acid is neutralized with sodium methylate and unreacted alcohols are distilled off in vacuo. The reaction of the epoxide groups is quantitative.

The starting materials used and the characteristics of the polyol-containing mixtures thus obtained are listed in Table 2.

TABLE 2
Characteristics of the Fatty Polyols.

| Fatty Polyol No. | Epoxy Fatty Alcohol | Hydroxy Compound | Molar Ratio Epox. Fatty Alcohol To Hydroxy Comp. | —OH number (mg of KOH/g) |
|---|---|---|---|---|
| 1 | A | glycol | 1:3 | 386.5 |
| 2 | A | glycol | 1:1 | 326.2 |
| 3 | A | glycol | 2:1 | 292.3 |
| 4 | C | glycol | 1:3 | 407.5 |
| 5 | C | glycol | 1:1 | 347.3 |
| 6 | C | glycol | 2:1 | 296.1 |

3. Cured Fatty Polyol Coatings

In the following Examples, the following terms have the following meanings:

Polyol A: 9(10)-bis(hydroxymethyl)octadecanol.
Catalyst A: an acid catalyst designated VP-451 available from BYK Mallinkrodt.
Catalyst B: an acid catalyst designated CAT 4040 available from American Cyanamid.
Pencil Hardness: as defined in ASTM D 3363-74.
Flexibility Forward and Reverse Impact: as defined in ASTM D 2794-74

The coatings described in Table 3 were prepared as follows. The indicated polyol was mixed with hexamethoxymethylmelamine (Cymel® 303, available from American Cyanamid) at the solids ratio indicated in Table 3. 2-ethoxyethyl acetate (Cellosolve® acetate, available from Union Carbide Corporation) was added until a 83% solids level was obtained. To this mixture was added Catalyst A (1.67%, based on resin solids) or Catalyst B (0.5%, based on resin solids) as indicated, to produce a heat-curable, air-sprayable paint.

The resulting paints were airspray applied to Bonderite 1000 treated steel panels to give the indicated film build. The coating was then cured at the temperature indicated for the time indicated. The cured coatings were tested for hardness and flexibility as indicated.

In Table 3, the examples representative of the present invention are denoted an arabic numeral and comparative examples are denoted by a letter. The data in Table 3 shows that representative polyols of this invention have superior flexibility as compared to a comparable fatty triol.

TABLE 1

Characteristics of Epoxidized Fatty Alcohols

| EPOXIDIZED FATTY ALCOHOL | EPOXIDE NUMBER (MOLE % OF EPOXIDE OXYGEN) | COMPOSITION | | | | | | HYDROXYL NUMBER, mg OF KOH/g | STARTING IODINE NUMBER mg OF I/g |
|---|---|---|---|---|---|---|---|---|---|
| | | $C_{10}$ | $C_{12}$ | $C_{14}$ | $C_{16}$ | $C_{18}$ | $C_{20}$ | | |
| A | 2.5–2.7 | 0 | 0–2 | 2–7 | 25–35 | 55–75 | 0–2 | 210–220 | 50–55 |
| B | 4.1–4.3 | 0 | 0–2 | 2–7 | 8–18 | 70–83 | 0–3 | 209–219 | 84–89 |
| C | 4.4–4.7 | 0 | 0 | 0 | 2–9 | 90–97 | 0–2 | 200–210 | 92–96 |
| D | 4.3–4.8 | 0 | 0 | 0 | 5–10 | 90–95 | 0–2 | 200–220 | 110–130 |

TABLE 3
Cured Coatings from Fatty Polyols and a Methylolamino Curing Agent

| EXAMPLE | FATTY POLYOL | SOLIDS RATIO | SOLIDS LEVEL (WT %) | CATALYST | VISCOSITY (CPS AT 25° C.) | FILM BUILD (MILS) | CURE TEMP. (°C.) | CURE TIME (MIN) | PENCIL HARDNESS | IMPACT (inch - lbs) FORWARD | FLEXIBILITY (inch - lbs) REVERSE |
|---|---|---|---|---|---|---|---|---|---|---|---|
| 1 | 4 | 70/30 | 83 | A | 160 | 1.0 | 178 | 30 | H | 40-50 | 2-5 |
| A* | A | 60/40 | 83 | A | 230 | 1.25 | 178 | 30 | 2H | 1-15 | <2 |
| 2 | 1 | 48/52 | 60 | B | — | 1.0 | 121 | 20 | HB | 28 | 2 |
| 3 | 2 | 52/48 | 60 | B | — | 1.0 | 121 | 20 | 2B | 58 | 22 |
| 4 | 3 | 54/46 | 60 | B | — | 1.0 | 121 | 20 | 2B | 56 | 42 |
| 5 | 4 | 47/53 | 60 | B | — | 1.0 | 121 | 20 | HB | 30 | <2 |
| 6 | 5 | 50/50 | 60 | B | — | 1.0 | 121 | 20 | 3B | 38 | 4 |
| 7 | 6 | 54/46 | 60 | B | — | 1.0 | 121 | 20 | 4B | 60 | 12 |
| B | A | 42/58 | 60 | B | — | 1.0 | 121 | 20 | H | 20 | <2 |

*It was noted that the coating of this comparative Example was stress-cracked after two days of exposure to normal temperature changes.

I claim:

1. A composition of matter which is a mixture of at least one methylolamino compound and at least one fatty polyol of the formula:

$$R^1-((R^2-O)-CH-CH-(O-R^3))-R^4-O-R^5$$

wherein:
$R^1$ is a monovalent hydrocarbon radical having from 2 to 14 carbon atoms;
$R^2$ and $R^3$ are individually selected from the group of hydrogen, hydroxyl-substituted alkyl radicals, hydroxyl-substituted alkoxyalkyl radicals and hydroxyl-substituted poly(oxyalkylene) radicals, provided that each radical contains from 2 to 32 carbon atoms and from 1 to 9 hydroxyl substituents and, provided further, that at least on of $R^2$ and $R^3$ is other than hydrogen;
$R^4$ is a divalent hydrocarbon radical having from 4 to 14 carbon atoms provided that the sum of the carbon atoms in $R^1$ and $R^4$ must be from 10 to 24; and
$R^5$ is selected from the group of hydrogen, hydroxyl-substituted alkyl radicals, hydroxyl-substituted alkoxyalkyl radicals, hydroxyl-substituted poly(oxyalkylene) radicals, provided that each hydroxyl-substituted radical contains from 2 to 32 carbon atoms and from 1 to 9 hydroxyl substituents, and acyl radicals having the structural formula;

$$OC-R^6-((R^7-O)-CH-CH-(O-R^8))-R^9$$

wherein:
$R^6$ is a divalent hydrocarbon radical having from 3 to 13 carbon atoms;
$R^7$ and $R^8$ are individually selected from the group of hydrogen, hydroxyl-substituted alkyl radicals, hydroxyl-substituted alkoxyalkyl radicals and hydroxyl-substituted poly(oxyalkylene) radicals, provided that each radical contains from 2 to 32 carbon atoms and from 1 to 9 hydroxyl substituents and, provided further, that at least one of $R^7$ and $R^8$ is other than hydrogen; and
$R^9$ is a monovalent hydrocarbon radical having from 2 to 14 carbon atoms provided that the sum of the carbon atoms in $R^6$ and $R^9$ must be from 9 to 23.

2. The composition of claim 1 wherein one of $R^2$ and $R^3$ is hydrogen and one is the residue of ethylene glycol or trimethylolpropane.

3. The composition of claim 1 wherein $R^1$ is a straight chain alkyl group having 8 carbon atoms and $R^4$ is a straight chain alkylene group having 8 carbon atoms.

4. The composition of claim 1 wherein $R^5$ is hydrogen.

5. The composition of claim 1, wherein the methylolamino compound is the reaction product of formaldehyde and a member selected from the group consisting of:
A. melamine;
B. urea;
C. thiourea;
D. guanamines and benzoguanamines;
E. substituted thioameline;
F. triaminopyrimidine;
G. 2-mercapto-4,6-diaminopryimidine;
H. 3,5-diaminotriazole;
I. carbamylguanazole;
J. 2,4-diaminothiodiazole;
K. 2-oxo-4,5-diaminoparabanic acid; and
L. glycoluril,
and mixtures thereof.

6. The composition of claim 5, wherein the methylamino compound is etherified or partially etherified.

7. The composition of claim 1, wherein the fatty polyol compound is modified with a member selected from the group of alkylene oxides consisting of ethylene oxide and propylene oxide.

8. The composition of claim 1, wherein said fatty polyol compound is present in an amount ranging from about 10% to about 80%, by weight, and said methylolamino compound is present in an amount ranging from about 20% to about 90%, by weight.

9. A process for preparing a coating which comprises:
(a) mixing the composition of claim 1 with an acid catalyst to form a coating mixture,
(b) applying the coating mixture to a substrate, and
(c) curing the coating mixture on the substrate by heating the coated substrate to a sufficient temperature for a time sufficient to cure the coating mixture.

10. The cured coating composition as defined in claim 1.

* * * * *